Jan. 3, 1956   F. G. STEELE   2,729,773
ELECTRIC MOTOR CONTROL SYSTEM EMPLOYING DI-FUNCTION SIGNALS
Filed April 9, 1953   2 Sheets-Sheet 1

INVENTOR:
Floyd G. Steele
BY
ATTORNEY

INVENTOR:
Floyd G. Steele
BY
*Walter J. Jason*
ATTORNEY

2,729,773

ELECTRIC MOTOR CONTROL SYSTEM EMPLOYING DI-FUNCTION SIGNALS

Floyd G. Steele, La Jolla, Calif., assignor to Digital Control Systems, Inc., a corporation of California Application April 9, 1953, Serial No. 347,803

10 Claims. (Cl. 318—28)

The present invention relates to an electric motor control system employing di-function signals and, more particularly, to a system employing di-function signals for providing both derivative and proportional control in the energization of an electric motor.

The present invention contemplates a system for controlling the energization of an electric motor such that its shaft will rotate a given or predetermined number of revolutions and then halt. The principal type of control information utilized by the present system is that of electrical signals in di-function form. Although such an information form has been discussed at length in various co-pending applications for patent, notably, U. S. application for patent, "Computer and Indicator System," filed September 26, 1952, Serial No. 311,609, to Floyd G. Steele, it may be said by way of review that the most common form of di-function signal essentially comprises a series of alternate high and low voltage levels, of the type produced, for example, by a bistable multivibrator circuit. Associated with such a di-function signal is a timing signal measuring or marking timing intervals, with each of the high or low voltage levels of the di-function signal appearing for an integral number of such intervals. Each high voltage level of the di-function signal appearing for one timing interval is termed a $+1$ instantaneous di-function value, with each low voltage level appearing for a single interval being termed a $-1$ instantaneous di-function value.

This sign of a di-function signal is determined by the relative frequency of occurrence of one instantaneous value relative to the other. Thus, if more $+1$ instantaneous values occur during a given period of time than do $-1$ values, then the di-function signal over this period of time is said to be positive. Conversely, if the number of $-1$ values exceeds the number of $+1$ values during a period of time, then the di-function signal is said to be negative during this period. Although di-function information is essentially non-numerical in form, a numerical value may be assessed for a di-function signal by subtracting the number of $-1$ values from the number of $+1$ values during a given number of timing intervals and dividing the result thereof by the number of the given timing intervals.

In the present system, the shaft of the motor to be controlled is coupled through appropriate brushes to a di-function quantizer normally producing alternate $+1$ and $-1$ di-function values. However, the quantizer responds to each revolution of the shaft to produce an extra $+1$ instantaneous value, that is, two $+1$ values occurring in succession. The output signal of the quantizer is then deconverted, that is, a single output signal is formed from each two consecutive $+1$ values therein. This deconverted signal, in turn, is applied to the input terminal of a binary counter into which has been initially placed as a count, the number of revolutions desired for the motor to make.

This binary counter responds to each input signal to reduce the initially set in count by one binary digit value. In addition to the binary counter, there is associated therewith a single stage having a permanently set binary value of one, which permanent binary value corresponds to the next higher place digit than the highest significant digit count in the counter. The counter, including its associated permanently set stage, in turn, is coupled by a transfer network to a storage register and each timing interval, measured by a synchronizing timing signal, the contents of the binary counter and permanent stage are additively transferred into the register. Each of these additions produces an output carry digit, the series of carry digits thus produced during a series of timing intervals forming a signal having di-function characteristics. In particular, one and zero valued carry digits correspond to $+1$ and $-1$ instantaneous di-function values, respectively. The binary counter with the permanently set stage, the transfer network, and the storage register together form a digital integrator.

The di-function signal emanating from the register and the di-function signal produced by the di-function quantizer are combined by a di-function parallel half-adder to produce a di-function output signal whose di-function value is the average of its two input signal values. This adder output signal, in turn, is applied to a motor control circuit which effectively controls the energization to the motor. Particularly, this control circuit operates to apply full power in a designated forward direction to the motor in response to each $+1$ instantaneous value appearing in the adder output signal, and full energization in a designated negative direction to the motor for each $-1$ value in the adder output signal.

The number initially placed in the binary counter, equaling the number of revolutions to be made by the motor, at first causes a considerable surplus of $+1$ to $-1$ values to appear in the output signal of the digital integrator. This, in turn, is responded to by the motor control circuit for applying a greater quantity of full power to the motor in the designated forward direction than it does in the reverse direction with the result that the motor will initiate rotation. As the motor rotates, the count in the counter is reduced and the positive value of the initial di-function signal applied to the motor control circuit is accordingly reduced in value. This continues with the motor receiving smaller and smaller amounts of energization in its positive direction, until the count in the counter substantially reaches zero at which time, the motor control signal contains equal numbers of forward and negative energizations. The motor accordingly ceases rotation and the shaft at that time will have completed the number of revolutions initially set, as a binary number, into the counter of the integrator.

The output signal of the digital integrator accordingly provides proportional control for the motor while the quantizer output signal, added thereto in the half-adder, provides linear control for the motor. With both proportional and linear control being present in the system, considerable stability is achieved and varying loads placed on the motor during its rotational cycle will be totally ineffective to vary the number of revolutions made thereby.

Another embodiment of the motor control circuit is given, it serving in response to a zero count in the counter to positively disengage the source of energy from the motor and thus eliminate any possibility of motor overshoot with a subsequent undesired recycling operation of the system.

It is therefore the principal object of the present invention to provide a device using di-function signal information for energizing an electric motor with both linear and proportional control.

Another object of the present invention is to provide a device for controlling the energization of an electric motor with a di-function signal such that its shaft completes a given number of revolutions and then stops.

A further object of the present invention is to provide a device utilizing di-function signal information and having both derivative and proportional control properties for controlling the number of revolutions made by the shaft of an electric motor.

A still further object of the present invention is to provide a device employing a digital integrator for proportionally controlling the energy applied to an electric motor.

Still another object of the present invention is to provide a device for producing a di-function signal whose value represents the derivative of the displacement of the shaft of an electric motor, integrating the di-function signal by a digital integrator and combining the integrated signal with the original di-function signal to provide a control di-function signal which when applied to the motor causes the shaft of the motor to complete a number of revolutions initially placed as a count within the integrator.

Other objects and features of the present invention will be readily apparent to those skilled in the art from the following specification and appended drawings wherein is illustrated a preferred form of the invention, and in which.

Figure 1:
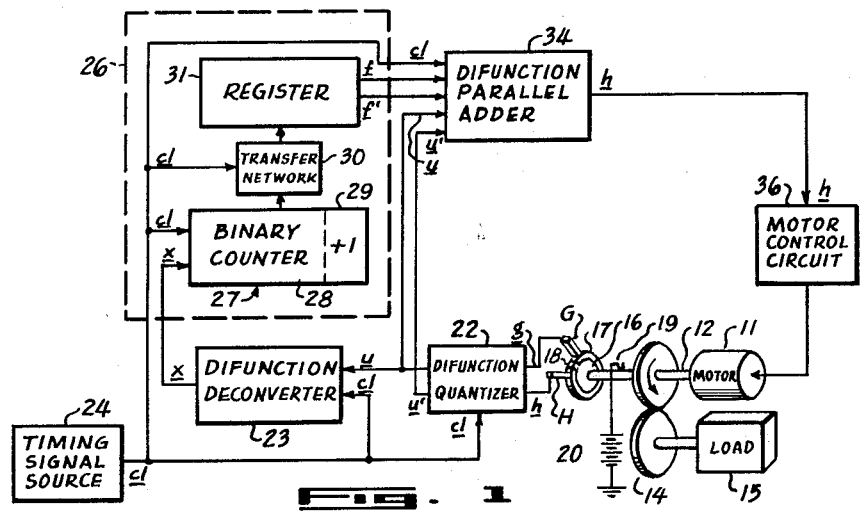
Figure 1 is a block schematic representation of the system of the present invention.

Referring now to the drawings wherein like circuit components are given the same numerical designation, there is illustrated in Figure 1 the di-function motor control circuit according to the present invention. A motor 11 having a shaft 12 drives a load, designated, through a gear train 14. A disc 16 of conductive material is affixed to the end of shaft 12, disc 16 having an annular ring 17 of non-conductive material extending around a major portion of the periphery thereof leaving a narrow segment or arm 18 of the conductive portion extending to the outer periphery thereof. One end of a conductive spring clip 19 makes wiping conductive contact with shaft 12, its other end being connected to the positive terminal of a source of potential, such as battery 20, the negative terminal thereof being grounded. A pair of spaced brushes G and H make conductive wiping contact with the outer periphery of disc 16 and, in turn, are coupled to two of the input terminals, respectively, of a di-function quantizer 22, similar to the uni-directional quantizer illustrated in Figure 11 of the before-referred to application for patent.

A timing signal source 24, produces an output timing signal $cl$ which is applied to the remaining input terminal of quantizer 22. One of the complementary output signals $u$ of quantizer 22 is applied to one of the input terminals of a di-function deconverter 23, similar to the deconverter illustrated in Figure 8 of the before-referred to application for patent, with the other input terminal of deconverter 23 being coupled to the output terminal of timing signal source 24 to thereby receive timing signal $cl$.

The output signal, designated $x$, of deconverter 23 is applied along with timing signal $cl$ as input signals to a binary counting mechanism 27. Counting mechanism 27 includes a binary counter 28 and a final stage 29 containing a permanent binary value of 1. Mechanism 27 is coupled through a transfer network 30, also receiving timing signal $cl$, to a binary number storage register 31.

Counting mechanism 27, transfer network 30, and register 31 form, in combination, a digital integrator 26, the pair of complementary output signals, $f$ and $f'$, of the register forming the output signals thereof.

Signals $f$ and $f'$ are applied to a pair of the input terminals of a di-function half-adder or averager 34, similar to either of the adders illustrated in Figure 7a or 7b in the before-referred to application for patent. Output signal $u$ and its complementary output signal $u'$ of quantizer 22 are also applied as input signals to adder 34 as is timing signal $cl$.

The output signal $h$ of adder 34, corresponding to signal $e$ of the adders of Figures 7a and 7b of the patent application, is applied as an input signal to motor control circuit 36, the output signal of which is utilized to energize motor 11.

The circuit diagram of counting mechanism 27 is later set forth in Figure 3 while the circuit diagram of transfer network 30 and register 31 is set forth in Figure 4, with two embodiments of motor control circuit 36 being illustrated in detail in Figures 2 and 5, respectively.

The function contemplated for the present system is to energize motor 11 such that its shaft will complete a given number of revolutions and then halt. In actual practice, the particular number of shaft rotations desired will be determined by load 15. For example, if load 15 comprises a mechanism for driving a piece of cloth, a sheet of aluminum, etc., then motor 11 may be stopped after a given dimension of the material has been measured out. In such a use, the system of the present invention acts as a measuring device since the ensuing motor stoppage will take place only after a predetermined length of material has been driven past.

Initially, the exact number of shaft rotations desired for motor 11 is placed into binary counter 28 of mechanism 27 in the form of a binary number. Then, with the motor being actuated, conductive arm 18 on disc 16 in making successive wiping contacts between brush G and H apply, in turn, high voltage levels, corresponding to the potential of battery 20, successively on the signal $g$ and $h$ input conductors of di-function quantizer 22. As will be appreciated from the description of operation of quantizer 22 as set forth in the above-referred to application for patent, quantizer 22 produces a normally zero valued output di-function signal comprising alternate $+1$ and $-1$ instantaneous values. Upon completion, however, of each brush G-brush H contact sequence, output signal $u$ of quantizer 22 contains an additional $+1$ value, that is, two consecutively appearing $+1$ instantaneous values.

It should be here noted that di-function signal $u$ is proportional to a function of the derivative of the shaft displacement. This may be seen to be true by considering that if signal $u$ were directly applied to any conventional binary counter, the count accumulated during any length of time would represent the actual displacement of the shaft in terms of numbers of complete rotations. Thus, since the count itself represents the shaft displacement, the signal producing the count may be considered as representing the derivative or, more specifically, as being proportional to a function of the derivative of the shaft displacement.

Now, since only a unidirectional quantizer is used, not all of the circuit comprising di-function deconverter 23, corresponding to the deconverter in Figure 8 of the referred to application for patent, need be utilized, since signal $u$ will only contain extra $+1$ values and will never contain extra $-1$ values. Accordingly, the output signal $x$ conductor of deconverter 23 corresponds to conductor 47 in Figure 8 of the application, deconverter 23 acting in the manner explained, to produce a high voltage level appearing for one-half a timing interval each instance signal $u$ contains two adjacent $+1$ instantaneous values. Thus, signal $x$ will contain a high voltage level after each brush G-brush H contact sequence by arm 18 which, in turn, corresponds to one complete rotation of shaft 12 in the, as viewed from Figure 1, counterclockwise direction.

Before considering in detail the operation of integrator 26, it should be here noted that binary counter 28 comprises a pair of interconnected electronic switches, their conduction states at any instant representing the count contained in the counter. Also, as stated before, stage 29 permanently produces a high voltage level representing a continuous binary value of one. Register 31 comprises three electronic switches, one for each switch in counter 28 and one for permanent set stage 29. Transfer network 30 comprises a series of "and" and "or" gating circuits connected such that the binary number represented by the voltage levels within counting mechanism 27 is additively transferred into register 31 at the end of each signal $cl$ timing interval.

The complementary output signals $f$ and $f'$ of register 31 represent the overflow or carry digits produced by each additive transfer. Signal $f$, for example, will be at a high voltage level, representing the binary digit 1, each timing interval a carry or overflow digit is produced from the last significant digit flip-flop of the register. On the other hand, each timing interval no carry or overflow digit is produced, signal $f$ will be at its low voltage level. Thus, signal $f$ will comprise a series of alternate high and low voltage levels, each of the levels appearing for an integral number of timing intervals. It may be shown mathematically that signal $f$ is essentially a di-function signal with each high voltage level thereof appearing for a timing interval representing an instantaneous di-function value of $+1$ and each low voltage level thereof appearing for a timing interval representing a $-1$ instantaneous di-function value. The value of di-function signal $f$, in turn, will be proportional to a function of the integral of the number appearing in counting mechanism 27.

Since the final stage of mechanism 27 is not connected to counter 28, but instead has a continuous value of 1, it is apparent that if the number in counter 28 is of zero value, a continuous adding of the contents of counting mechanism 27 into register 29 will produce a zero di-function value in signal $f$ since the binary 1 value in set stage 29 corresponds to the next higher significant binary place digit than that contained in the most significant place digit flip-flop of the counter.

This is true since this most significant place digit value of 1, considering mechanism 27, will be continuously added to itself producing, in binary terms, zero and one as alternate carry values which, in turn, correspond to a zero valued di-function signal. Now, if the count in counter 28 is greater than zero, then a greater portion of $+1$ to $-1$ values will be produced in the output signal since a greater number of one valued carry digits will occur.

Thus, the di-function value of signal $f$ will be proportional to the magnitude of the count within binary counter 28. That is, the higher the value of the binary number in counter 28, the greater the ratio of $+1$ to $-1$ values which will appear in signal $f$. In the same manner, the smaller the count or binary number in counter 28, the more nearly the number of $+1$ values will equal the number of $-1$ values in signal $f$.

It may thus be seen that the di-function value of signal $f$ is inversely proportional to a function of the shaft displacement or number of shaft rotations since at the beginning of operation before initiation of shaft rotation when the number in binary counter 27 is the highest, the value of signal $f$ will be the greatest. As the contents of counter 27 decrease in value, owing to continued shaft rotation and consequently greater shaft displacement, the signal $f$ di-function value will accordingly decrease since transfers of smaller and smaller numbers in mechanism 27 will produce correspondingly fewer extra one valued carry digit outputs. It will also be appreciated, as the contents of binary counter 28 approach zero in magnitude, as will occur upon motor 11 completing a number of revolutions substantially equal to the number initially placed in counter 27, output signal $f$ will be of substantially zero value, the $+1$ values thereof being caused by the digit one value permanently placed in set stage 29.

Considering now the operation of parallel adder 30, in conjunction with its two pairs of input signals $f$, $f'$ and $u$, $u'$, the di-function value of output signal $h$, in the manner described previously in connection with its operation in the above-referred to application for patent, will be the average of the di-function values of its two pairs of input signals. In particular, if signals $f$ and $u$ are each zero valued, then signal $h$ will likewise be a zero value. However, upon each appearance of two extra $+1$ values in either or both of signals $f$ and $u$, signal $h$ will contain a single extra $+1$ di-function value, which represents the average of the two input $+1$ values.

Referring now briefly to motor control circuit 36, to be described in greater detail later, circuit 36 responds to each $+1$ di-function value in signal $h$ for providing full energization to the windings of motor 11 such that a counterclockwise torque, as viewed in Figure 1, is applied to its shaft. On the other hand, circuit 36 responds to each $-1$ value in signal $h$ to fully energize the motor windings such that a clockwise torque is applied to its shaft 12. The frequency of timing source $cl$ and the inertia of motor 11 should be so related that a substantially zero valued input di-function signal to the circuit 36 will produce no overall displacement of shaft 12. However, upon each appearance of an extra $+1$ value in signal $h$, the two consecutive timing intervals motor 11 is energized in the same direction will produce corresponding counterclockwise rotation of shaft 12. Circuit 36 will thus apply rotational energy to the motor in an amount proportional to the di-function value of signal $h$.

Returning now to the operation of the system, it is apparent that at the beginning of operation, owing to the count in binary counter 28 being at its predetermined and highest value, output signal $f$ will, at that time, contain the greatest ratio of $+1$ to $-1$ values. This, in turn, will cause signal $h$ to have its greatest ratio of $+1$ to $-1$ values, considered over a complete cycle of operation with the result that, at the beginning, motor 11 receives its maximum energization to rotate shaft 12 in the counterclockwise direction.

As will also be appreciated, owing to the initial relatively high impetus given shaft 12 in the desired direction, signal $u$ of quantizer 22 will initially contain a relatively large number of extra $+1$ values thereby effectively adding to the positive value of signal $h$. However, as the count in counter 28 is decreased in accordance with the shaft 12 rotation, signal $f$ will, as brought forth previously contain fewer and fewer extra $+1$ values causing a decrease of the shaft velocity. This, in turn, causes signal $h$ to have fewer and fewer $+1$ values with the result that motor 11 receives a decreasing amount of energization in its counterclockwise direction. Thus, fewer and fewer extra $+1$ values are produced in signal $u$ which, in turn, act to decrease the number of $+1$ values in signal $h$. The overall effect of this action is to slowly decrease the speed of shaft 12 since motor 11 will receive full energization in its clockwise direction for fewer and fewer extra $+1$ valued timing intervals.

Continuing with the operation, as the binary count in counter 28 approaches zero, then the di-function value of signal $f$ will approach zero with motor 11 receiving less and less energy for rotating its shaft 12 in the designated direction. Thus, integrator 26 provides, as is commonly known in the art, proportional control for the motor since the energy applied thereto is proportional to the magnitude of shaft displacement still required at any instant to complete the given number of revolutions. Thus, when a zero count is at last attained in the counter, motor 11 slows down to the point where it is capable of completing no more revolutions and with circuit 36 consequently providing it with a zero valued effective energization, its shaft rotation ceases entirely. Also, signal $u$, in being averaged with signal $f$ by averager 34, provides, as termed in the art, linear control of the motor since its value is linearly related to the velocity of shaft 12.

Figure 2:
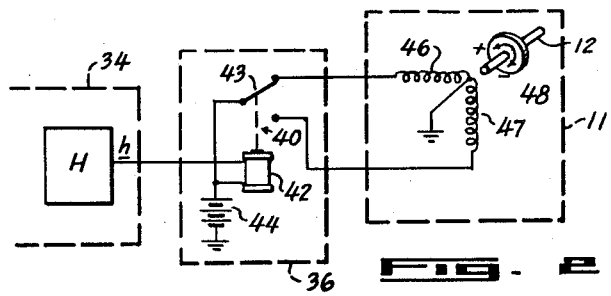
Figure 2 is a circuit diagram of a portion of the motor control circuit of Figure 1.

Referring now to Figure 2, there is illustrated motor control circuit 36 as it applies energy to motor 11, here also illustrated in schematic form. Thus, output signal $h$ of adder 34 as it appears on the signal $h$ output conductor of a flip-flop H therein, is applied to one end of a relay coil 42 included within a relay 40, the other end of coil 42 being connected to the positive terminal of a source of potential, such as battery 44. The negative terminal of battery 44 is connected to ground and relay 40 additionally includes a movable switch arm 43 adapted to engage either upper or lower relay contact points. Switch arm 43 is coupled to the positive terminal of battery 44 with the upper contact of relay 40 being connected to one end of a winding 46 within motor 11. Also, the lower contact of relay 40 is connected to one end of another winding 47 within motor 11 with the other ends of windings 46 and 47 being mutually connected to ground.

Relay 40 is normally biased by battery 44 such that when signal $h$ is at its low voltage level, switch arm 43 makes engagement with the upper contact point and when signal $h$ is at its high voltage level, current flows through coil 42 through battery 44 to ground and this, in turn, actuates switch arm 43 to engage the lower contact. When switch arm 43 is in its up position, the potential of battery 44 is applied across coil 46, the resulting current thereof applying a torque on the motor armature 48 in the, as designated, clockwise or negative direction. However, when signal $h$ is high, then switch arm 43 by its engagement with the lower contact point applies the potential of battery 44 across winding 47 of motor 11, the ensuing current flow therethrough applying a positively designated or counterclockwise torque on armature 48.

Here, the response speed of relay 40 must be relatively fast in time in comparison to one timing interval which, in turn, measures the duration of each high and low voltage level appearing in signal $h$. Also, as before stated, the inertia of armature 48 and shaft 12 of motor 11 should bear such a relationship to the frequency of timing signal $cl$ that when signal $h$ is of substantially zero value no appreciable shaft vibrations will occur and, at the same time, should be capable of moving in its designated positive direction in response to two consecutive high voltage levels in signal $h$.

Figure 3:
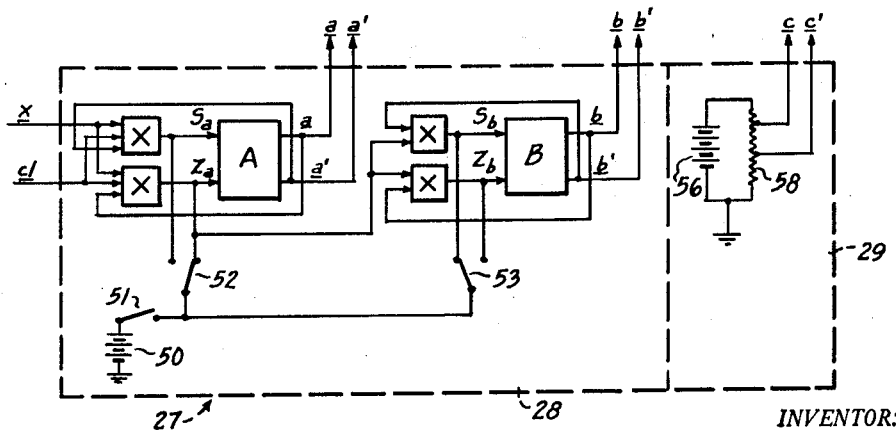
Figure 3 is a circuit diagram, partly in block schematic form, of the counting mechanism of Figure 1.

Referring now to Figure 3, there is illustrated in detailed form, binary counter 28 and stage 29 forming counting mechanism 27 of integrator 26. In particular, counter 28 is here illustrated as comprising, by way of example only, a pair of electronic switches, such as flip-flops A and B, so connected as to count down, in binary steps of one, each high voltage level appearing in the input signal $x$ from deconverter 23. The conduction states of flip-flops A and B represent the units and twos place digits, respectively, of the count with the counting down process, in turn, being produced by connections of appropriate "and" gating circuits to their input terminals.

In particular, the gating circuitry connected to the $S_a$ input conductor of flip-flop A is a mechanization of the Boolean equation:

$$S_a = x \cdot a' \cdot cl \qquad \text{(Eq. 1)}$$

Also, the gating circuitry connected to the $Z_a$ input conductor of flip-flop A may be expressed by the equation:

$$Z_a = x \cdot a \cdot cl \qquad \text{(Eq. 2)}$$

In the same manner, the input gating circuits to the $S_b$ and the $Z_b$ input conductors represent mechanizations of the respective equations:

$$S_b = x \cdot a' \cdot b' \cdot cl \qquad \text{(Eq. 3)}$$
$$Z_b = x \cdot a' \cdot b \cdot cl \qquad \text{(Eq. 4)}$$

The symbols and terminology herein employed for the gating circuitry and flip-flop is identical to that described and illustrated previously in the above-referred to application for patent.

As stated previously, before initiating a cycle of operation, it is first necessary to place the desired numerical count into counter 28, the count representing the number of rotations motor 11 is to make. One manner of setting in this count is illustrated in Figure 3 and includes a source of potential, such as battery 50, whose negative terminal is grounded and whose positive terminal is connected to the movable arm, for example, of a switch 51. The fixed contact point of switch 51, in turn, is connected to the movable switch arms of a pair of switches 52 and 53. Switch 52, for example, contains two fixed contact points, one of which is connected to the $S_a$ input conductor of flip-flop A, with the other contact point being connected to the $Z_a$ input conductor. In a corresponding manner, the two fixed contact points of switch 53 are connected to the $S_b$ and $Z_b$ input conductors of flip-flop B.

In operation, after the desired count has been determined, each of switches 52 and 53 is thrown to engage the particular contact point connected to the input conductor of its respective flip-flop in accordance with the binary digit value to be placed therein. Thus, for example, if the binary digits 1 and 0 were to be placed in flip-flops A and B, respectively, switch 53 would be thrown to engage the fixed contact point connected to the $S_b$ input conductor while switch 52 would be thrown to engage the contact point connected to the $Z_a$ conductor. With this accomplished, then switch 51 is closed with the potential of battery 50 being accordingly applied to the appropriate flip-flop input conductors. This, in turn, acts to trigger the flip-flops into the desired conduction states and an operational cycle of the system may then be initiated.

The permanent set stage 29 includes a source of potential, such as battery 56, the positive and negative terminals thereof being connected to the two ends of a resistor 58, with the negative terminal thereof being additionally coupled to ground. The voltage of battery 56 should be greater than the high voltages produced by flip-flops A and B. The signal $c$ and $c'$ output conductors from stage 29 are connected to a pair of tapped points on resistor 58, the points being so positioned relative to battery 56 that the voltages of signals $c$ and $c'$ are equal to the high and low voltage levels, respectively, as produced by flip-flops A and B, for example. As was noted in the before-referred to application for patent, the output signals of all flip-flops employed in a single system are preferably clamped so as to produce identical high and low voltage levels on each signal output conductor. Thus, by setting signal $c$ and $c'$ to the high and low levels, respectively, stage 29 produces output signals representing the binary digit one at all times.

Figure 4:
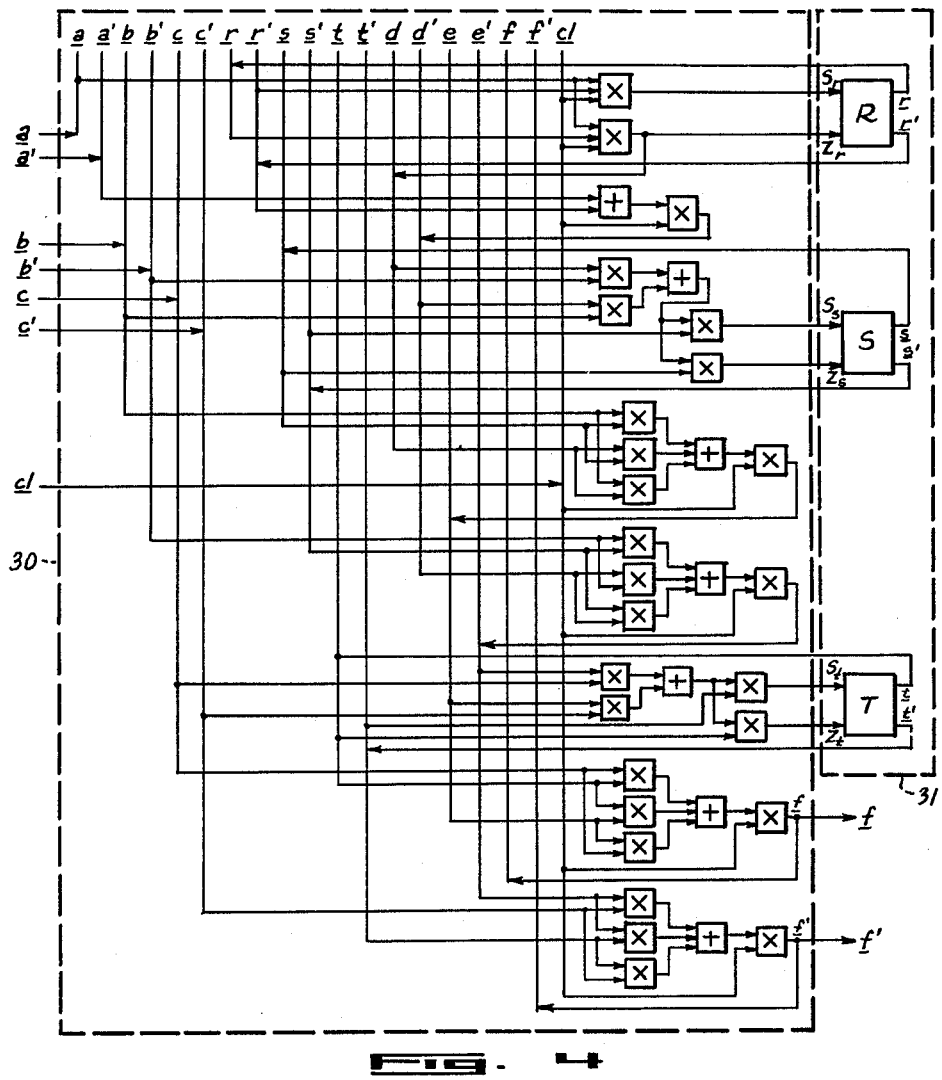
Figure 4 is a circuit diagram, partly in schematic form, of the transfer network and register of Figure 1.
Figure 5:
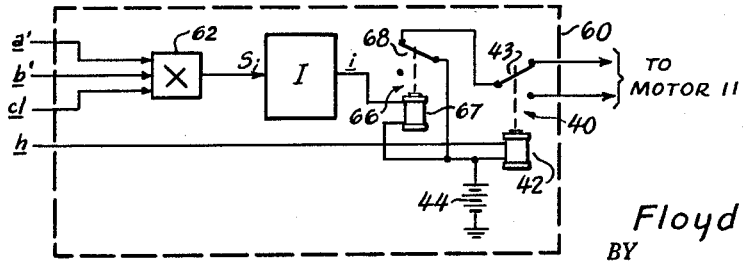
Figure 5 is another embodiment of the motor control circuit of Figure 2.

Referring now to Figure 4, there is illustrated in expanded form, transfer network 30 in conjunction with register 31. Register 31 includes three electronic switches, such as flip-flops R, S and T, corresponding to flip-flops A, B and stage 29, respectively, of counting mechanism 27. As stated previously, the binary number represented by the conduction states of flip-flops A and B and the high voltage level of signal $c$ is to be added by transfer network 30 each timing interval to the binary number represented by the conduction states of flip-flops R, S and T.

As an integral part of this addition process, network 30 must produce signals representing carry digits for each addition performed between the digits represented by the flip-flops A and R conduction states, the flip-flops B and S conduction states, and the signal $c$ and flip-flop T conduction state. The first two of such carry digit signals are required for securing a correct triggering of the S and T flip-flops representing the next higher significant digits, respectively, of the register number. Also, the carry digit resulting from each signal $c$ and flip-flop T addition is represented by the complementary signals $f$ and $f'$.

The carry digits produced by the addition of the digit values represented by the conduction states of flip-flops A and R are represented by the complementary signals $d$ and $d'$ here illustrated for convenience beneath flip-flop R, as viewed from Figure 4. Each carry digit represented by signals $d$ and $d'$, in turn, is utilized for securing proper addition of the B and S flip-flop contents, which addition, in turn, produces a carry digit herein represented by the complementary signals $e$ and $e'$ illustrated beneath flip-flop S. Signals $e$ and $e'$, in turn, are utilized to secure proper additions of the digit values represented by signals $c$ and $c'$ and the conduction state of flip-flop T which addition, in turn, produces carry digit signals, $f$ and $f'$ representing, as before stated, the di-function output values of digital integrator 26. Network 30, as stated previously, is formed of a plurality of "and" and "or" gating circuits interconnected to accomplish the above-stated results.

The manner of deriving this gating circuitry may be readily accomplished by use of appropriate truth tables, as known in Boolean and logical analysis, wherein is set forth the desired triggering operations for the various flip-flops. From the tables, Boolean equations may be written which, when mechanized, that is, converted into corresponding electrical circuits comprising "and" and "or" circuits, produce the above set forth triggering operations.

In particular, the equations corresponding to the specific gating circuitry connected to the input conductors of each flip-flop, as well as the complementary carry digit signals, are given below:

$$S_r = a \cdot r' \cdot cl \quad \text{(Eq. 5)}$$
$$Z_r = a \cdot r \cdot cl \quad \text{(Eq. 6)}$$
$$d = a \cdot r \cdot cl \quad \text{(Eq. 7)}$$
$$d' = (a' + r') \cdot cl \quad \text{(Eq. 8)}$$
$$S_s = (d' \cdot b + d \cdot b') \cdot s' \quad \text{(Eq. 9)}$$
$$Z_s = (d' \cdot b + d \cdot b') \cdot s \quad \text{(Eq. 10)}$$
$$e = (b \cdot s + d \cdot s + d \cdot b) \cdot cl \quad \text{(Eq. 11)}$$
$$e' = (b' \cdot d' + d' \cdot b' + d' \cdot s') \cdot cl \quad \text{(Eq. 12)}$$
$$S_t = (e' \cdot c + e \cdot c') \cdot t' \quad \text{(Eq. 13)}$$
$$Z_t = (e' \cdot c + e \cdot c') \cdot t \quad \text{(Eq. 14)}$$
$$f = (c \cdot t + e \cdot t + e \cdot c) \cdot cl \quad \text{(Eq. 15)}$$
$$f' = (e' \cdot c' + e' \cdot t' + c' \cdot t') \cdot cl \quad \text{(Eq. 16)}$$

As will be noted, timing signal $cl$ is not here used for directly controlling the flip-flop triggerings but instead is applied to final "and" gating circuits producing the carry digit signals. Since each input conductor of each flip-flop receives at least one of these latter signals through gating circuits, it is seen that indirectly the clocking signal does produce the flip-flop triggerings.

An unsatisfactory operation may occur if the electrical and mechanical parameters of the Figure 1 system are not carefully balanced, that is, motor 11 may, in being driven toward the zero count of counter 28, turn one revolution too far with the result than a digit value of one will be subtracted from the pure zero count then existent in the counter. If this occurs, then each zero therein will be transformed into a one and the cycle of operation again initiated. Upon such an event, motor 11 will then make a number of revolutions equal to the maximum count capacity of counter 28 before once more producing a zero count in counter 28. In order to eliminate the possibility of this occurrence, reference is now made to Figure 5 wherein is illustrated another motor control circuit which positively stops any further energization of motor 11 after a binary count of zero has been reached.

This automatic stoppage is effected by applying the $a'$ and $b'$ output signals and timing signal $cl$ to the input terminals of an "and" gating circuit 62, the output terminal of circuit 62 being coupled to the $S_i$ input conductor of an electronic switching device, such as flip-flop I. The output signal $i$ conductor of flip-flop I is coupled to one end of coil 67 included within a relay circuit 66, the other end of coil 67 being connected to the positive terminal of battery 44, as before illustrated in the motor control circuit 36 of Figure 2. Here, instead of having a direct connection between the positive terminal of battery 44 and the movable switch arm of switch 43, as was done in circuit 36, the positive terminal of battery 44 is connected to the movable switch arm of a switch 68 actuated by relay 66, the upper contact point thereof being, in turn, connected to the movable switch arm of switch 43. The movable switch arm of switch 68 is normally biased to its up contact position and will remain in that position so long as signal $i$ remains at a low voltage level. As formerly, the upper and lower contact points of switch 43 are connected to windings 46 and 47, not here again illustrated, of motor 11 in the manner shown in Figure 2.

In operation, the conduction state of flip-flop I should be initially set such that signal $i$ is at its low voltage level with the result that the upper contact point engagement will be made by the movable switch arm of switch 68. During such engagement, circuit 60 acts in the manner set forth previously for circuit 36 in that energy is alternately applied to the two windings of motor 11 in accordance with the di-function values of input signal $h$.

As will be realized, as long as the count in counter 28 is above zero, that is, any of the flip-flop stages contains a one value, then owing to "and" gating circuit 62, no triggering signal will be applied to the $S_i$ conductor. Hence, as long as a count of any magnitude remains in counter 28, flip-flop I will remain at its low voltage conduction state and motor control circuit 60 will actuate motor 11 in the manner previously explained in connection with Figure 2.

When, however, the count reaches zero, as represented by simultaneously appearing high voltage levels, in signals $a'$ and $b'$, then gating circuit 62 will be actuated to apply a triggering signal to the $S_i$ conductor with the result that signal $i$ will go high. This, in turn, will actuate the switch arm of relay 66 to its down position and battery 44 will be disconnected from switch 43 with the result that no further energy will be applied to motor 11. Motor 11 will accordingly receive no further energization and will be incapable of continuing its rotation and subsequent recycling.

As will be appreciated, if counter 28 contained more stages than that specifically illustrated, the primed output signal from each of such stages should be connected along with timing signal $cl$ to an "and" gating circuit similar to circuit 62. Such a gating circuit would then provide an appropriate triggering signal to the I flip-flop upon the attainment of a zero count with the ensuing positive motor stoppage.

No limitation is intended on the size of integrator 26 by the specific illustration in Figures 3 and 4 of only three stages. As will be evident, as many stages may be utilized as desired for the particular operation contemplated for motor 11. These additional stages may be quite readily designed by the employment of truth tables, as noted above, with the subsequent mechanization of the Boolean equations derived therefrom.

Also, the motor control system as illustrated contemplates that motor 11 will make an integral number of full revolutions before coming to a stop. By incorporating a plurality of conductive arms, similar to the arm 18, around the periphery of disc 16, and maintaining the parameter relationships necessary between their thicknesses and the brush G and H placements, as mentioned and discussed in the above-referred to applications for patent, then motor 11 may be energized to rotate given fractions of shaft revolutions, each fraction being determined by the spacing between two adjacent conductive arms.

Also, an up-down binary counter could be substituted for counter 28 with no change of operation in the system. Furthermore, if this latter substitution is made, then deconverter 23 could be omitted with the up-down counter counting up and down for each +1 and −1 value, respectively, in signal $u$.

I claim:

1. A device for controlling the number of revolutions made by the shaft of a motor, said device comprising: binary counting means having a predetermined count representing the number of revolutions to be made by the motor shaft, said counting means being responsive to each input signal for reducing its count one binary digit value; means responsive to each predetermined amount of rotation of the shaft for producing an output signal; means for applying the output signal of the last-named means to said binary counting means; means for producing an output di-function signal whose value is a function of the count in said binary counting means; and means for applying driving energy to said motor in an amount proportional to the value of said output di-function signal.

2. A device for controlling the shaft displacement made by an electric motor, said device comprising: a digital integrator responsive to the displacement of the motor shaft for producing an output di-function signal whose value in inversely proportional to the displacement; and means for applying energy to the motor in an amount proportional to the value of said output di-function signal.

3. A device for controlling the shaft displacement made by the shaft of a motor, said device comprising: a digital integrator including a binary counter having initially placed therein a binary number corresponding to the amount of shaft displacement to be made by the motor, said counter being responsive to each input signal for reducing its count, said integrator producing an output di-function signal whose value is proportional to the count in said counter; means responsive to each predetermined of shaft displacement for applying an input signal to said counter; and means for applying an amount of rotational energy to the motor proportional to the value of said output di-function signal.

4. A device for controlling the angular displacement of the shaft of an electric motor, said device comprising: means for producing a first di-function signal whose value in inversely proportional to a function of the angular displacement made by the shaft of the motor; means for producing a second di-function signal whose value is proportional to a function of the velocity of the motor shaft; means for combining said first and second di-function signals to produce a third di-function signal whose value is both proportionally and linearly related to the motor shaft displacement; and means for energizing the motor in accordance with the value of said third di-function signal to thereby afford both linear and proportional control of the motor shaft displacement.

5. A device for controlling the shaft displacement of an electric motor, said device comprising: di-function quantizing means coupled to the shaft of the motor for producing a first di-funcition signal whose value represents a derivative of the motor shaft displacement; di-function integrating means responsive to said first di-function signal for producing a second di-function signal whose value represents a function of the shaft displacement; di-function averaging means responsive to said first and second di-function signals for producing a third di-function signal representing the average of said first and second di-function signals; and means responsive to a function of the value of said third di-function signal for applying rotational energy to the motor.

6. The system according to claim 5 wherein the last-named means responds to each +1 instantaneous value of said third di-function signal for applying full power in one direction to the motor and response to each −1 di-function signal for applying full reverse power to the motor.

7. A device for controlling the amount of energization applied to an electric motor having a shaft, said device comprising: quantizing means coupled to the shaft of the motor for producing an output di-function signal whose value represents a derivative function of the shaft displacement; and means responsive to said output di-function signal for applying forward and reverse energy to said motor, the number of forward applications of energy less the number of reverse applications of energy being a function of the value of said output di-function signal.

8. In combination: a binary counting mechanism including a plurality of binary counting stages and a single permanently set binary digit stage, the binary value in the permanently set stage representing the highest significant place digit value in the counting mechanism, said binary counting stages being responsive to each input signal for reducing by one binary digit the count represented thereby; a storage register including a plurality of stages, one for each of said binary counting stages and one for said permanently set stage; a transfer network coupled between said counting mechanism and said register and responsive at predetermined intervals of time for adding the values in each of the stages of said counting mechanism to its corresponding stage in said register, the successive carry digits produced by the stage in said register corresponding to said permanently set stage constituting a first di-function signal; an electric motor including a shaft, said motor being responsive to first and second input signals for driving said shaft in designated positive and negative directions of rotation, respectively; a di-function quantizer coupled to said shaft and producing a second di-function signal, said quantizer normally producing in said second di-function signal a series of alternate +1 and −1 instantaneous di-function values but responsive to each predetermined amount of motor shaft rotation for producing an extra +1 value; di-function deconverting means conductively coupled to said quantizer and responsive to each extra +1 value in said second di-function signal for producing an output signal; means for setting in an initial count in the binary counting stages of said counting mechanism equal to the amount of rotation desired by said motor shaft; means for applying said deconverted signal to the binary counting stages of said binary counter mechanism whereby said first di-function signal has a value inversely proportional to a function of displacement of said shaft; a di-function averager circuit responsive to said first and second di-function signals for producing a third di-function signal whose value is an average thereof; and normally operable means responsive to each +1 and −1 instantaneous value in said third di-function signal for applying first and second signals, respectively, to said motor, whereby said motor rotates its shaft a positive amount corresponding to the magnitude of the number set into said binary counter stages and then ceases rotation.

9. The combination according to claim 8 including, in addition, means responsive to a substantially zero count in said binary counting stages for rendering said normally operable means inoperative.

10. A device for controlling the shaft displacement of an electric motor, said device comprising: di-function quantizing means coupled to the shaft of the motor for producing a first output di-function signal whose value represents a derivative of the motor shaft displacement; digital integrator means responsive to said first di-function output signal for producing a second di-function signal whose value represents a function of the shaft displacement; and means responsive to the value of said second di-function signal for applying rotational energy to the motor.

References Cited in the file of this patent

UNITED STATES PATENTS

| | | |
|---|---|---|
| 2,537,427 | Seid et al. | Jan. 9, 1951 |
| 2,604,262 | Phelps et al. | July 22, 1952 |
| 2,630,552 | Johnson | Mar. 3, 1953 |
| 2,636,672 | Hamilton | Apr. 28, 1953 |
| 2,643,355 | Hallman, Jr. | June 23, 1953 |